(12) United States Patent
Middlecamp et al.

(10) Patent No.: US 11,048,671 B2
(45) Date of Patent: Jun. 29, 2021

(54) AUTOMATED STORAGE TIER COPY EXPIRATION

(71) Applicant: Quantum Corporation, San Jose, CA (US)

(72) Inventors: William Middlecamp, Apple Valley, MN (US); Jon Hendrickson, Lakeville, MN (US)

(73) Assignee: Quantum Corporation, San Jose, CA (US)

( * ) Notice: Subject to any disclaimer, the term of this patent is extended or adjusted under 35 U.S.C. 154(b) by 513 days.

(21) Appl. No.: 15/787,073

(22) Filed: Oct. 18, 2017

(65) Prior Publication Data
US 2019/0114332 A1 Apr. 18, 2019

(51) Int. Cl.
*G06F 16/185* (2019.01)
*G06F 3/06* (2006.01)

(52) U.S. Cl.
CPC .......... *G06F 16/185* (2019.01); *G06F 3/0608* (2013.01); *G06F 3/0614* (2013.01); *G06F 3/0649* (2013.01); *G06F 3/0652* (2013.01); *G06F 3/0685* (2013.01)

(58) Field of Classification Search
CPC .... G06F 16/185; G06F 3/0652; G06F 3/0685; G06F 3/0608; G06F 3/0614; G06F 3/0649
See application file for complete search history.

(56) References Cited

U.S. PATENT DOCUMENTS

| 6,330,572 | B1 * | 12/2001 | Sitka | G06F 19/321 |
| | | | | 707/608 |
| 7,103,740 | B1 * | 9/2006 | Colgrove | G06F 3/0605 |
| | | | | 707/999.202 |
| 8,280,853 | B1 * | 10/2012 | Lai | G06F 16/113 |
| | | | | 707/651 |
| 2006/0010150 | A1 * | 1/2006 | Shaath | G06F 16/125 |
| 2007/0083482 | A1 * | 4/2007 | Rathi | G06F 3/048 |
| 2010/0115061 | A1 * | 5/2010 | Tai | G06F 16/185 |
| | | | | 709/219 |
| 2013/0275653 | A1 * | 10/2013 | Ranade | G06F 3/0605 |
| | | | | 711/103 |
| 2014/0344234 | A1 * | 11/2014 | Amarendran | G06F 11/1458 |
| | | | | 707/694 |

(Continued)

*Primary Examiner* — Kris E Mackes
(74) *Attorney, Agent, or Firm* — Eschweiler & Potashnik, LLC

(57) ABSTRACT

Example methods and apparatus release storage locations in a tiered storage system by deleting expired tier-copies of a file stored in the tiered storage system. One embodiment includes a policy-class circuit that defines a tier-copy policy associated with a tier, where the tier-copy policy includes an expiration interval (EI) associated with the tier, and a schedule associated with the tier. A copy expiration circuit checks, according to the schedule, for expiration-eligible tier-copies of a file stored in the tiered storage system based, at least in part, on an EI associated with a tier, and on an access time (AT) associated with the file, where the AT denotes the last time the file was accessed. The copy expiration circuit, upon determining that a tier-copy is expiration eligible, declares the tier-copy as expiration eligible. A delete/restore circuit, upon the copy expiration circuit declaring that the tier-copy is expiration eligible, deletes the tier-copy.

22 Claims, 8 Drawing Sheets

(56) References Cited

U.S. PATENT DOCUMENTS

| | | | |
|---|---|---|---|
| 2015/0199131 A1* | 7/2015 | Powers | G06F 3/0608 |
| | | | 711/114 |
| 2015/0347451 A1* | 12/2015 | Lee | G06F 16/1844 |
| | | | 707/610 |
| 2016/0077750 A1* | 3/2016 | Erdmann | G06F 3/0647 |
| | | | 711/114 |
| 2017/0337235 A1* | 11/2017 | Chauvet | G06F 16/185 |

* cited by examiner

AUTOMATED STORAGE TIER COPY EXPIRATION

BACKGROUND

Business models having very large amounts of computer-data storage and needing the relatively fast access times of nearline storage must balance storage costs with access time requirements. A tiered data storage system may store data of different value on different storage media having different performance characteristics, and the value of that data may change over time. In a tiered data storage system, differently valued data, or data of different categories, may be stored on different storage media based on, for example, the category of the data, the age of the data, a frequency of access of the data, or data protection requirements associated with the data.

Conventionally, tiers that have low-latency tier-retrieve performance are limited in size because of cost. Thus, tiers that have better performance tend to be smaller because they cost more. Conversely, tiers that have large capacity at low cost tend to have poorer access-latency performance. While it is desirable to have faster tiers paired with larger tiers in a tiered data storage system to improve the average performance of the system, conventionally, the sizes of tiers have to match. In a conventional tiered data storage system, a slower low-cost tier used for permanent storage, and a faster higher-cost tier used for staging data to production performance-level disk, need to have the same capacity and store the same numbers of files. Thus, a conventional tiered storage system may have slower, low-cost tiers that are too small, and faster, higher-cost tiers that are too large and consequently prohibitively expensive. Changing a set of storage tiers on a per-file basis in a conventional system is too complicated and expensive a solution to be useful. Furthermore, conventional tiered storage systems do not have the ability to recreate file copies on tiers when file access frequency increases, and do not preserve the ordering of storage tiers.

BRIEF DESCRIPTION OF THE DRAWINGS

The accompanying drawings, which are incorporated in and constitute a part of the specification, illustrate various example systems, apparatus, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

A tiered storage system may use data storage devices that have different size, performance, and cost characteristics. For example, a tiered storage system may use tape drives, disk drives, cloud storage systems, or solid-state drives (SSD) to store a file, to store information about a file, to store redundant copies of a file, or to store other electronic data. While it may be ideal to have all data always available on the fastest possible storage device, this ideal may be too expensive to achieve. Hierarchical storage management may migrate data files that are used most frequently to higher speed access devices and may migrate data files that are used least frequently to lower speed access devices. Furthermore, the need for storage space must be anticipated for a storage system to be effective, because a delay in releasing space at the time storage is needed would be impractical. Tiered storage systems, including systems that employ hierarchical storage management, need to manage copy creation and deletion. Managing copy creation and deletion may involve, when freeing space on faster tiers, choosing the space that is least recently used (LRU). Managing copy creation and deletion may also involve, when data is referenced, restoring a copy from a slower tier into the faster tier.

Figure 5:
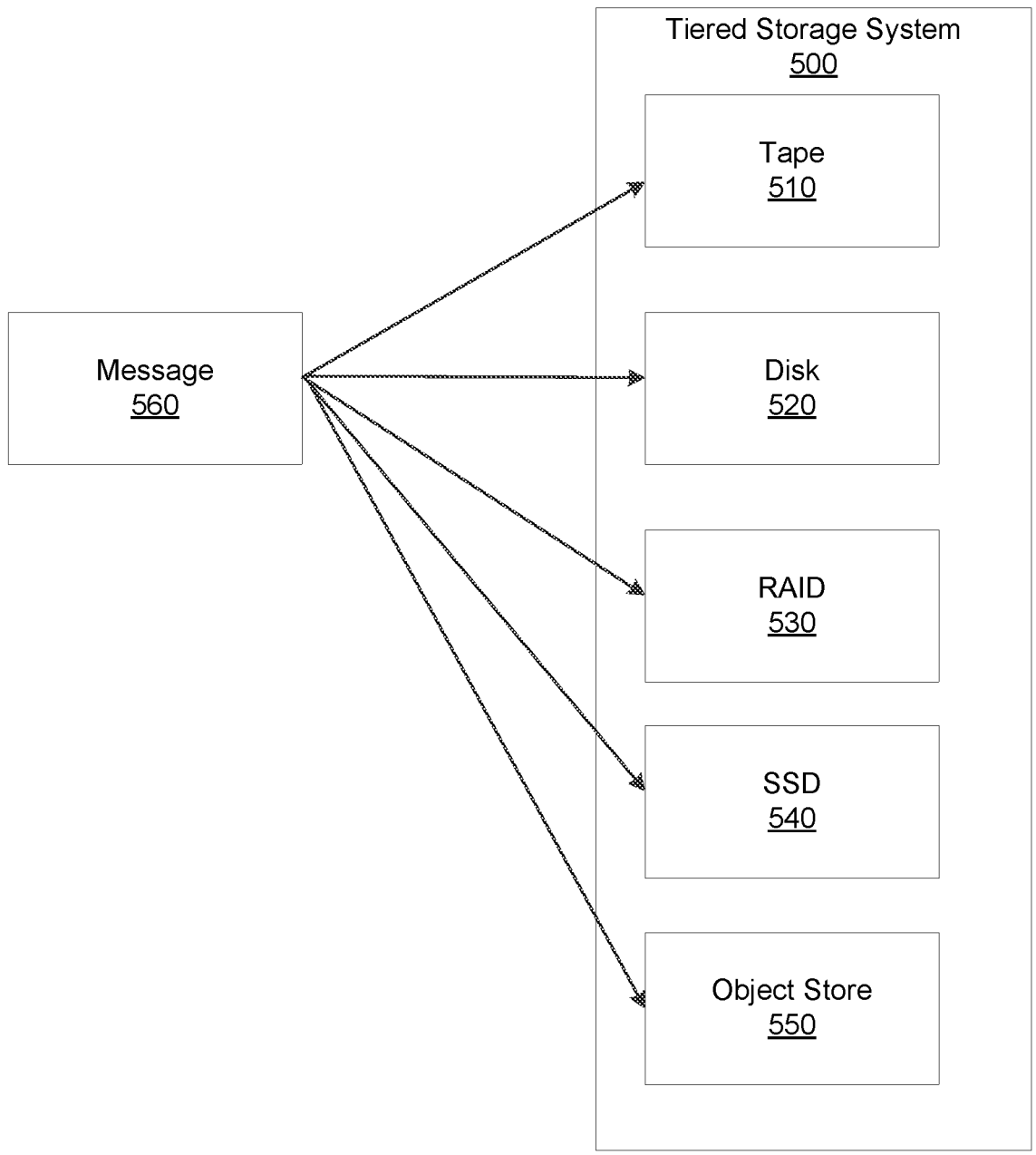
FIG. 5 illustrates an exemplary tiered storage system.

FIG. 5 illustrates an exemplary tiered storage system 500 in which embodiments described herein may operate or which embodiments described herein may control. A tiered storage system may include several devices arranged in different tiers to provide different levels of storage performance or redundancy for an item to be stored. For example, tiered storage system 500 includes a tape tier 510, a disk tier 520, a RAID system 530, an SSD 540, and an object store 550. Different tiered storage systems may include a greater or lesser number of a similar or different variety of devices. A simple tiered storage system may include, for example, a local disk storage tier, and an off-site, slower tape storage tier. The tiered storage system 500 may store a file 560. File 560 may be, for example, a file, a record, a message, an object, a table, or other forms of electronic data. Multiple copies of file 560 may be stored in storage system 500. For example, a copy of file 560 may be stored on disk tier 520, two copies may be stored on tape tier 510, and a copy may be distributed throughout RAID system 530. A copy stored to a tier may be referred to as a "tier-copy". Not all devices in tiered storage system 500 may be employed to store an item. Tiered storage system 500 may also include a cloud storage system or a metadata mirror, or be operably connected to the cloud storage system or the metadata mirror. Example methods and apparatus may store a copy of the file 560 to the cloud storage system. The cloud storage system may be configured to operate as a tier in data storage system 560. Metadata associated with the file 560 stored in the cloud storage system may be stored in the metadata mirror.

Large amounts of rapidly ingested data may decline in value over time. Large amounts of rapidly ingested data may also be needed quickly for immediate, time-sensitive, or mission-critical processing. For example, large amounts of meteorological data may be ingested to local production-performance-level disk at a high rate. The productionperformance-level disk may have only enough storage capacity for three days' worth of meteorological data. However, the data may need to be stored longer than three days, for analysis purposes, or for regulatory purposes, for example. Thus, the data may be copied to multiple tiers having a range of performance characteristics in a tiered storage system. The tiers may include, for example, an object storage tier, a linear tape open (LTO) tier, a hard drive tier, a SSD tier, a shingled magnetic recording (SMR) device tier, or tiers based on other storage devices. A file's disk copy may have its data removed after several hours while retaining its name and metadata to facilitate access to copies of the file's data in other tiers. In this example, copies in the medium-performance object-storage tier may be deleted after several days. Copies in the even slower LTO tier may be deleted after several months, or may even be retained for years.

In a conventional tiered storage system, the different tiers must have matching sizes. For example, in a conventional tiered storage system, the medium-performance object-storage tier and the slower LTO tier need to maintain copies for the same set of files. However, tiers that have better performance tend to cost more. Thus, managing copy creation and deletion becomes a complex problem, and the size or performance and cost of different tiers may be sub-optimal in a conventional tiered storage system.

Example apparatus, methods, systems, and other embodiments concern automatically releasing storage space by tier-copy in a tiered storage system based on a time since a file stored in the tiered storage system was last accessed. In embodiments described herein, tier-copies exist on asymmetric tiers. Example embodiments facilitate not waiting until the space on a tier is needed, but instead free the space in anticipation of future need. This is in contrast to conventional memory cache-based approaches that may grind to a halt when a fast performance tier is filled beyond a threshold level. In embodiments described herein, copies of all versions of a file that have been made to tiers of differing capacity, performance, and cost may be removed according to a dynamic expiration interval after the most recent user access of the file data. Example embodiments facilitate avoiding the hard stop that would occur when the lowest-capacity tier becomes full in a conventional system. The expiration interval is dynamic by virtue of being associated with a tier-copy policy, so that all files subscribing to the policy will be subject to a modified tier-copy expiration interval immediately following its change. In one embodiment, at least one tier-copy is not expired or deleted so that a file can be retrieved from the remaining tier-copy the next time the file is needed.

Example embodiments facilitate reducing administrative overhead costs or capacity required to store file copies on different levels of performance storage in a tiered storage system. Embodiments described herein include an automated copy aging and deletion process driven by an expiration-time value of a copy, where the expiration-time value is compared against the current time, and used to determine the eligibility for deletion of a tier-copy of the file. Example methods and apparatus dynamically create and delete tier-copies of files based on a per-tier time since last access per file. In one embodiment, an access time associated with a file may be updated in a situation where file data have not been read by a user application. Example methods and apparatus facilitate the addition of performance-cache storage tiers of different sizes to hierarchical (e.g. tiered) storage systems.

Embodiments described herein employ an expiration time interval per copy tier for copy removal after last file access, provide optional re-creation of tier-copies if the file is accessed again, and facilitate the automatic deletion of a file when the last-remaining tier-copy has expired. In one embodiment, a scheduled policy is employed to identify a tier-copy eligible for deletion. Identification of tier-copies eligible for deletion and the deletion of eligible tier-copies may be performed as a batch process. In one embodiment, during a periodic administrative process, the deleted tier-copy may be waived from being stored again. For example, the deleted tier-copy may not be stored again by an administrative process that corrects anomalies to the application of a policy. An administrative process may be, for example, a rebuild process. Embodiments described herein are configurable on a per-class, per-copy basis. For example, different tiers may be subject to different schedules, and different tiers may have different expiration intervals having different values.

In one embodiment, a tier-copy stored in a tiered storage system may be deleted. Deleting a tier-copy facilitates deleting all the active and inactive versions of a tier-copy in a copy tier without the tier-copy being restored again by a rebuild policy. A tier-copy may be deleted automatically based on an expiration time or expiration interval (EI). A per-class per-copy configuration includes an EI value that is added to a file's access time (AT) to determine a point in time after which the tier-copy may be deleted. The EI may be in seconds, minutes, hours, or other unit of measurement. A process is run periodically by the tiered storage system or by a scheduler, to process automatic deletions. A tier-copy may also be deleted manually. For example, in a tiered storage system in which some tier-copies are configured for expiration, a command to permanently delete versions of a file's tier-copies may be initiated. This is in contrast to a conventional tiered storage system in which a version of a file's copy may be deleted, but in which a storage policy employed by the conventional system will recreate the copy soon after deletion, eliminating the possibility of freeing space. Example embodiments avoid such inefficient or unwanted recreation of copies.

Embodiments described herein may further facilitate mitigating disruptive anomalous activity in a tiered data storage system through use of manual tier-copy deletion. For example, a workflow may involve a system with 20 TiB of disk, ingesting five new TiB of data per day, processing that new 5 TiB of data for two days, and then expiring the data residing on the fastest tier after seven days. The data reside on production disk during the two days of processing. Then, the disk space is released to make room for new ingest. The disk runs approximately 50~75% full. The fastest tier runs at an average 35 TiB, and may be sized at 40 TiB. At one point in time, there is an anomaly that requires re-processing a few days' worth of the latest seven days' data. The fastest tier may be used to stage the data back to disk quickly, which is its purpose. This will update the access times of those files, which could cause the fastest tier to run out of space as the re-accessed data reside on the fastest tier longer than planned as new data continue to stream in. Conventionally, an administrator could temporarily change the EI to expire the tier-copies more quickly, but that would entrain the true-recent data with the data that were accessed for the anomaly. Instead, in embodiments described herein, the administrator can manually accelerate the expiration of the anomaly data. Manual deletion or acceleration of the expiration of anomalous data thus mitigates disruptive activities.

In one embodiment, a situation may arise in which a tier-copy may expire (e.g., the value of the access time plus the expiration interval may be less than or equal to the current time) before the tier-copy has actually been stored. For example, in some situations, the expiration time for a tier-copy may pass before the tier-copy has been stored. In this situation, it may be desirable to avoid performing the action to store the tier-copy. Otherwise, the tier-copy may be deleted immediately after or soon after the store action, and the store action would thus be a wasted effort. Embodiments described herein facilitate avoiding the store action when the expiration time for a tier-copy has passed before the tier-copy has been stored, reducing the number of operations performed by the tiered storage system, reducing wear and tear on the storage device, and thereby improving the energy efficiency and performance of the system compared to conventional approaches.

In one embodiment, a tier-copy may be stored after a file has been retrieved from another tier-copy because it was accessed. In this situation, a file that is accessed may be said to have been referenced. Tier-copies may be configured to be restored on reference. Accessing a file may cause expired tier-copies (that may have been deleted) to be reinstated (e.g. recreated, re-stored) for the current version of the file when those tier-copies have been configured to be restored upon reference. When a file is retrieved from another tier's copy, the file is marked such that the tier-copy will be stored according to a policy based on modification time. The file's access time is caused to be updated by the reference, and the expiration time for deleting the tier-copy again is calculated based on the updated access time. In this situation, the file's access time may be updated before the tier-copy is restored, so that the updated access time is used for a subsequent expiration evaluation.

In one embodiment, tier-copy deletion includes deleting all versions of copies on that tier for a file. For example, in a situation in which a file with multiple tier-copies having multiple versions has one tier-copy that is expired, all of the versions of that tier-copy associated with that file are removed. In the event that the file's version is changed, and an access results in a tier-copy of that version being retrieved from another tier, and the restore-on-reference option is on, that version may be stored to the deleted tier-copy's tier. In the event that the file's version is changed to a version without an access to cause a retrieve of that version, the file remains truncated and that version of the tier-copy remains expired.

In one embodiment, a file that has had all of its tier-copies deleted is automatically removed. For example, when the last tier-copy of a file is expired, example methods and apparatus may automatically remove the file even if the file is not truncated. In embodiments described herein, the default expiration behavior is that the last remaining tier-copy of a file will not expire. In another embodiment, this default expiration behavior may be overridden.

Figure 6:
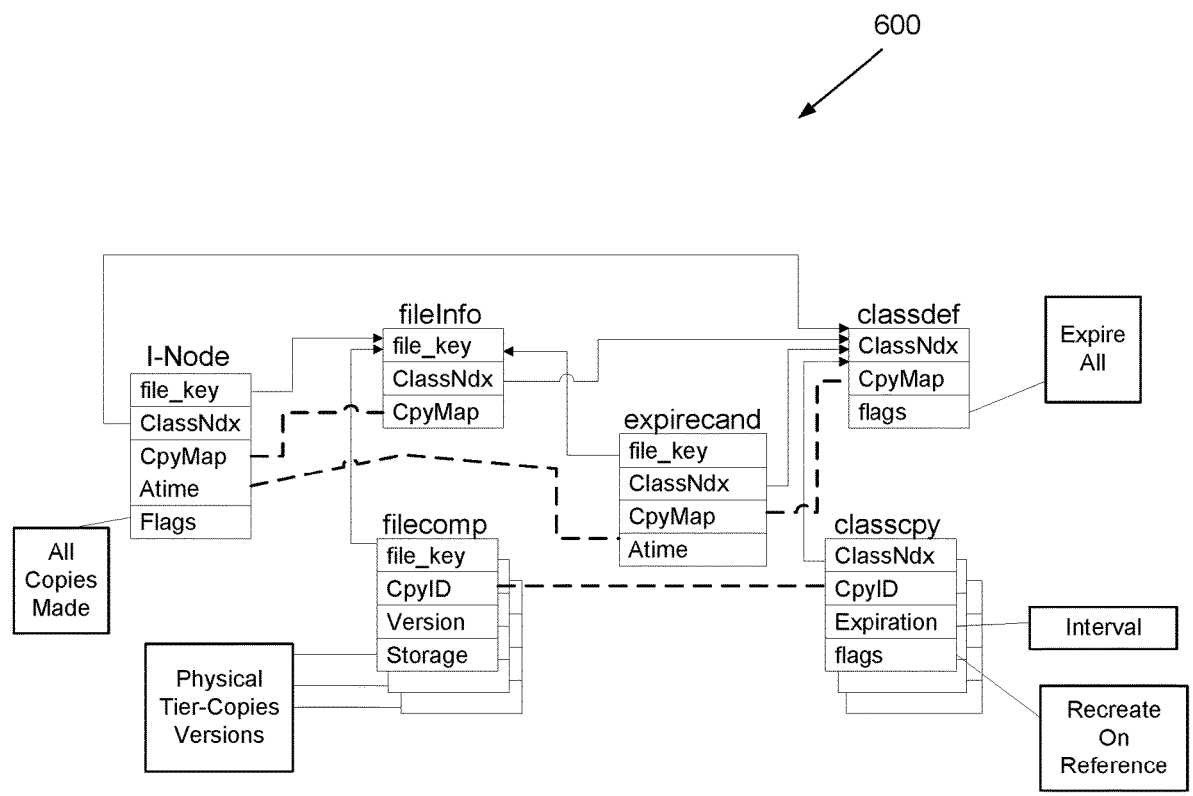
FIG. 6 illustrates an example visualization of a database associated with example embodiments.

Example embodiments may regulate the creation of tier-copies of a file on tiers of storage using per-file elements of a file information database table and inode extended attributes. FIG. 6 illustrates an example database architecture that may be employed by embodiments of example methods and apparatus described herein. In FIG. 6, dashed lines indicate algorithmic relationships. Solid lines point to (e.g. reference) a source. In this example, a fileinfo database table may include per-file cpymap elements. The cpymap bits are derived from a class policy in effect at the time of file creation. The cpymap bitmap elements indicate the tier-copies that should be created. As the tier-copies are created, per-copy records are created in a filecomp table. When all the tier-copies, or a threshold number of tier-copies have been made, an ALL_COPIES_MADE flag of the inode is set. A set ALL_COPIES_MADE flag indicates that the file is eligible for expiration or truncation. As tier-copies expire, the corresponding bits in the inode cpymap are cleared, while the fileinfo cpymap field is unchanged. The existence of tier-copies may be tested within the database by comparing the per-file cpymap in the fileinfo table to the per-copy rows in the filecomp table.

In this example, a classcpy database table contains the per-class per-copy configuration for expirations. A class, in this example, may refer to a policy. When the per-class per-copy configuration is changed, it immediately applies to all the files in the class. The last tier-copy for a file may not be expired even if the change makes the last tier-copy of a file expiration-eligible except when the override flag is set in the class configuration. In this example, the override flag is represented by Expire All. In another embodiment, when the per-class per-copy expiration configuration is changed, it is applied to a threshold number of files in the class. For example, the number of tier-copies may be set according to the current class configuration when a file is created. The number of tier-copies does not change unless a user forces a change using, for example, an fschfiat command. In contrast, the EI may apply immediately.

In this example, expiration of a tier-copy causes all inactive versions as well as the active version of that tier-copy to be deleted. When the restore-on-reference option is set for a file copy, the current version of the file can be stored again when the file is retrieved from another tier-copy by reference to the file. In this example, expiration cannot occur before a file's ALL_COPIES_MADE flag is set. When the cpymap flag is zero and the inode ALL_COPIES_MADE flag is set, embodiments described herein may delete the file.

In this example, when a file is modified, the inode cpymap field is set to the fileinfo cpymap value and the ALL_COPIES_MADE flag is cleared. Setting the inode cpymap field to the fileinfo value and clearing the ALL_COPIES_MADE flag results in all tier-copies of the file being stored for the new version of the file. When a file's version is changed other than by modification, the inode values of expiration and cpymap are calculated from the fileInfo cpymap value and the existing copies at the targeted version level in the filecomp table.

In this example, deletion of tier-copies is performed per expiration policy. The search for files that need copy-expiration processing is optimized by using an expirecand database table instead of just reading from the inode associated with a file. The expirecand table has a row per file awaiting expiration of one of its copies. The expirecand table includes an approximate value of the access time for the file and the latest on-disk cpymap value. When fspolicy determines that a tier-copy is older than the tier's configured expiration time, the true access time is verified at the inode. Upon verification of the true access time, all expired tier-copies' versions are deleted and the expirecand row is either updated with the new on-disk cpymap value, or deleted if there are no more expiration-eligible tier-copies for the file.

In this example, when a file having one or more expired tier-copies is referenced, the file is retrieved from an available tier-copy. The file is then stored again to its expired tiers where the restore-on-reference flag is set for those tiers in the class copy configuration. The ALL_COPIES_MADE flag in the inode is cleared to prevent truncation of the disk copy before all the copies have been stored.

While the embodiments described herein are described using particular table and field names, including ALL_COPIES_MADE, cpymap, expirecand, and so on, the particular table and field names described herein are only one example of a possible embodiment. One of ordinary skill in the art will appreciate that such table and field names are not limiting, and that other, different table and field names could be employed.

Figure 1:
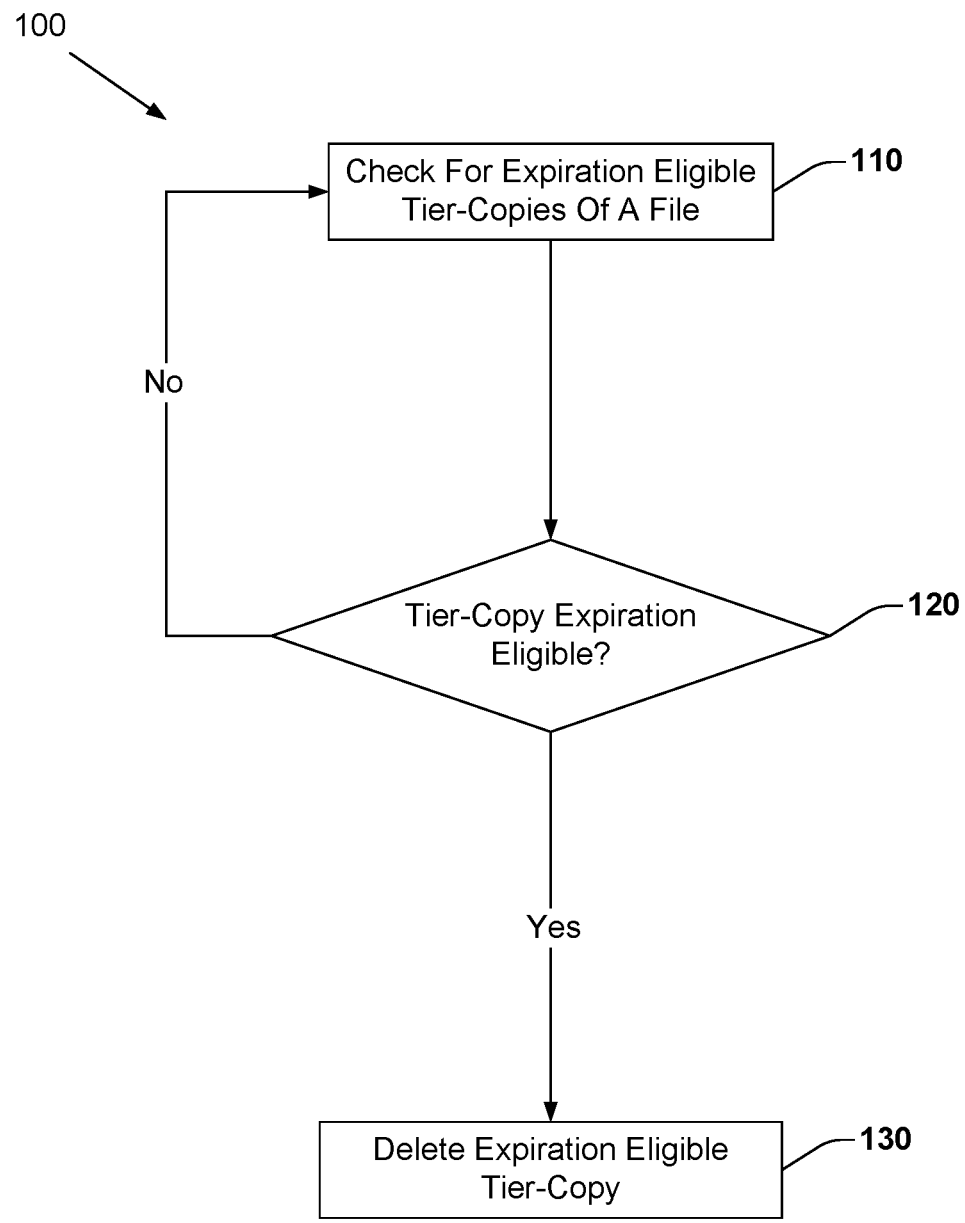
FIG. 1 illustrates an example method associated with automatically releasing storage space in a tiered storage system.

FIG. 1 illustrates an example method 100 for automatically releasing storage space in a multi-tier data storage system. The multi-tier data storage system includes at least two tiers. The at least two tiers include different types of data storage apparatus selected from a random-access memory (RAM) apparatus, a flash memory apparatus, a solid-state device (SSD) apparatus, a disk apparatus, a tape apparatus, and a cloud-based storage apparatus. In another embodiment, the at least two tiers may be selected from other, different types of electronic data storage apparatus. Members of the at least two tiers have performance characteristics. For example, in one embodiment, a first member of the at least two tiers has a capacity, a performance level, a reliability, or a cost of use, and a second member of the at least two tiers has a different capacity, a different performance level, a different reliability, or a different cost of use. In another embodiment, members of the at least two tiers may have other, different performance characteristics.

A member of the at least two tiers has an associated tier-copy policy. A tier-copy policy includes an expiration interval (EI) associated with the tier. In one embodiment, the EI is a positive integer value in seconds. In another embodiment, the EI may be defined in other units, including minutes, hours, or days. A tier copy-policy also defines a schedule that controls the multi-tier data storage system to check for expiration-eligible tier-copies of a file stored in the multi-tier data storage system.

Method 100 includes, at 110, controlling the multi-tier data storage system to check for expiration-eligible tier-copies of a file stored in the multi-tier data storage system, according to the schedule defined by the tier-copy policy. A file stored in the multi-tier data storage system has an associated access time (AT) that denotes the last time the file was accessed. A tier-copy is stored in a location in a tier. Multiple tier-copies may be associated with a file, and may be stored in the multi-tier data storage system. For example, a first tier-copy may be stored in a first tier, a second tier-copy may be stored in a second, different tier, while a third tier-copy may be stored in a third, different tier.

Method 100 also includes, at 120 determining if a tier-copy of the file is expiration eligible. Method 100, at 120, determines if the tier-copy is expiration eligible based, at least in part, on the EI and the AT.

Method 100 further includes, at 130, upon determining, based, at least in part, on the EI and the AT, that a tier-copy of the file is expiration eligible, deleting the tier-copy. Deleting the tier-copy includes releasing the storage space or location in the tier in which the tier-copy was stored.

In one embodiment, method 100 also includes, upon detecting that the file stored in the multi-tier data storage system has been accessed, updating the AT associated with the file. Updating the AT associated with the file may include updating an AT stored in an inode associated with the file. Updating the AT associated with the file may further include updating, asynchronously from updating the AT storied in the inode, an AT stored in a row in a data base table associated with the file. For example, updating the AT stored in a row in a data base table may include updating an "Atime" value in a row in the expirecand table illustrated in FIG. 6, while updating the AT stored in the inode may include updating the Atime parameter stored in the inode illustrated in FIG. 6. The expirecand table is configured, in one embodiment, to operate as a work list for future expiration-processing candidate tier-copies. In one embodiment, the AT associated with the file may be updated independently of a user access of the file.

Figure 2:
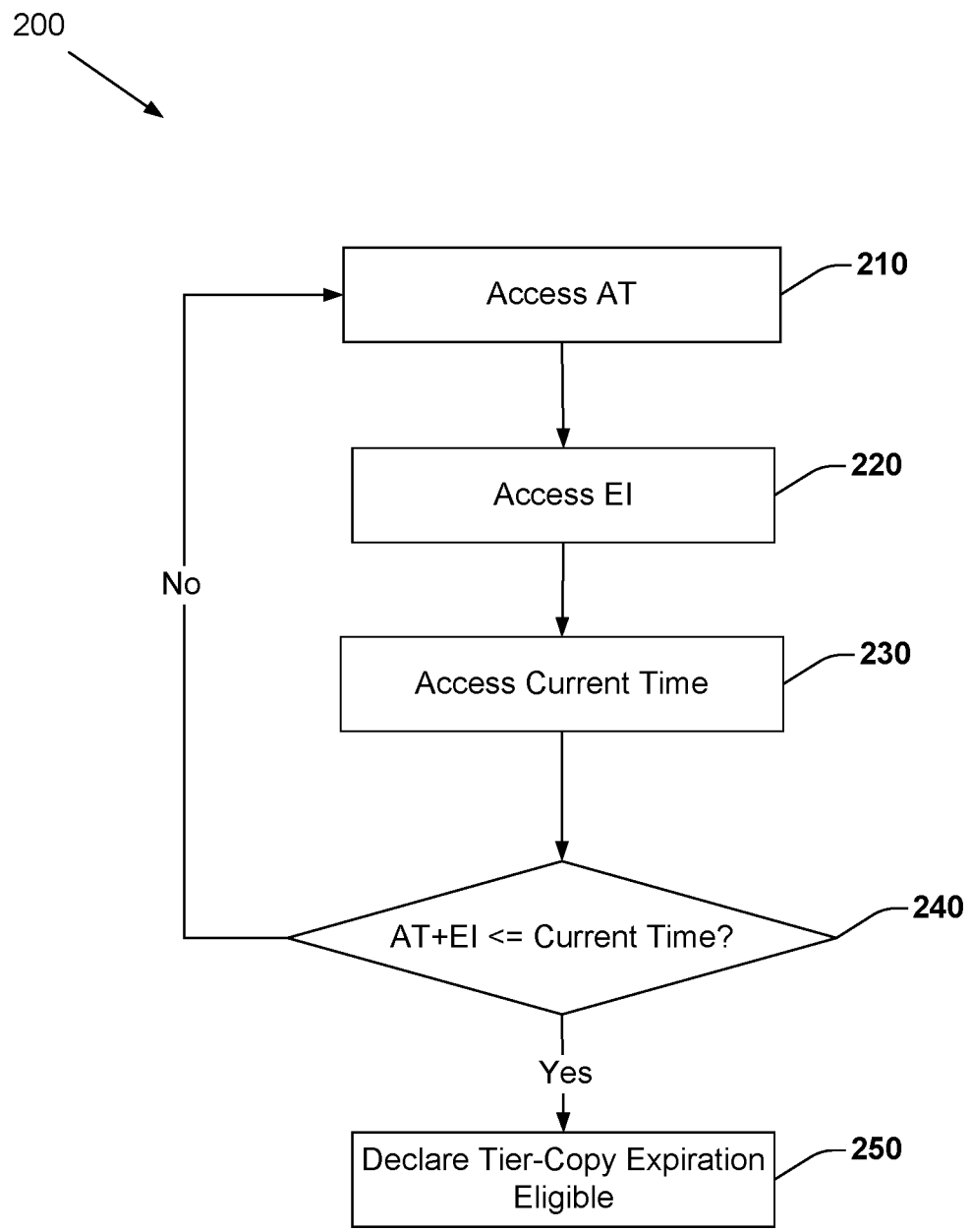
FIG. 2 illustrates an example method associated with determining if a tier-copy is expiration eligible.

FIG. 2 illustrates an example method 200 for determining if a tier-copy of the file is expiration eligible. Method 200 is suitable for use by embodiments described herein, including method 100, method 400, or apparatus 700. Method 200 facilitates controlling the multi-tier data storage system to check for expiration-eligible tier-copies of the file. Method 200 includes, at 210, accessing the AT value associated with the file. Accessing the AT may include acquiring electronic data, reading from a computer file, receiving a computer file, reading from a computer memory, or other computerized activity.

Method 200 also includes, at 220, accessing the EI associated with the tier. Accessing the EI may include acquiring electronic data, reading from a computer file, receiving a computer file, reading from a computer memory, or other computerized activity. For example, accessing the EI may include accessing an "Expiration" value stored in a row in the classcpy table illustrated in FIG. 6.

Method 200 also includes, at 230, accessing a current time. Accessing a current time may include acquiring electronic data, reading from a computer file, receiving a computer file, reading from a computer memory, or other computerized activity. Accessing a current time may include accessing a system time, receiving a master clock signal, or other approach to accessing a current time associated with the multi-tier storage system. Accessing a current time does not include a human looking at a clock on a wall, or at a wrist-watch.

Method 200 also includes, at 240, computing a sum of the AT and the EI. In one embodiment, computing the sum of the AT and EI may include controlling a processor to access a stored value for the AT and a stored value for the EI, and controlling the processor to compute the sum of the stored values. Method 200 further includes at 240 determining if the sum of the AT and EI is less than or equal to the current time.

Method 200 further includes, at 250, upon determining that the sum of the AT and the EI is less than or equal to the current time, declaring the tier-copy as expiration eligible.

Figure 3:
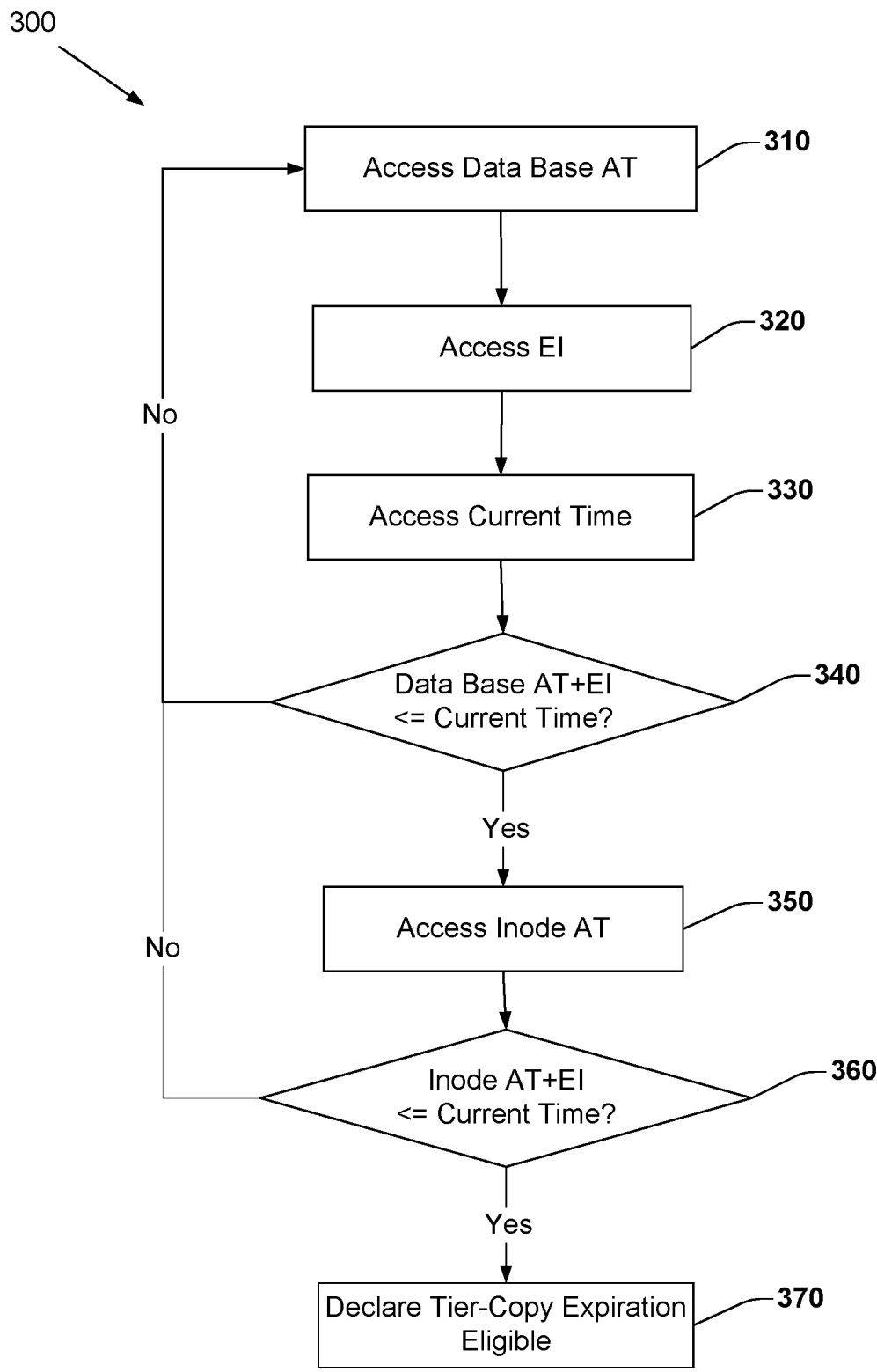
FIG. 3 illustrates an example method associated with determining if a tier-copy is expiration eligible.

FIG. 3 illustrates an example method 300 for determining if a tier-copy of the file is expiration eligible. Method 300 is suitable for use by embodiments described herein, including method 100, method 400, or apparatus 700. Method 300 is similar to method 200, but includes additional details and elements. Method 300 includes, at 310, accessing the AT stored in the row in the data base table associated with the file. For example, method 300 may control a processor to access the "Atime" value stored in a row associated with the file in the expirecand table illustrated in FIG. 6.

Method 300 also includes, at 320, accessing an EI associated with a tier. Accessing the EI may include accessing the "Expiration" value stored in a row associated with the tier-copy policy in the classcpy table illustrated in FIG. 6.

Method 300 also includes, at 330, accessing a current time. Accessing a current time may include accessing a system time, receiving a master clock signal, or other approach to accessing a current time associated with the multi-tier storage system.

Method 300 also includes, at 340, computing a first sum of the EI and the AT stored in the row in the data base. Method 300 further includes, at 340, determining if the first sum is less than or equal to the current time. In another embodiment, method 300 may include, at 340, determining if the first sum is less than the current time, or within a threshold difference of the current time. The threshold difference may be, for example, one second, ten seconds, or other time value.

Method 300 also includes, at 350, upon determining that the first sum is less than or equal to the current time, accessing the AT stored in the inode associated with the file.

Method 300 also includes, at 360, computing a second sum of the EI and AT stored in the inode. Method 300 further includes, at 360, determining if the second sum is less than or equal to the current time. In another embodiment, method 300 may include, at 360, determining if the second sum is less than the current time, or within a threshold difference of the current time.

Method 300 further includes, at 370, upon determining that the second sum is less than or equal to the current time, declaring the tier-copy as expiration eligible. In one embodiment, method 300 further includes, upon determining that the value of the AT stored in the row is different than the value of the AT stored in the inode, updating the AT stored in the row with the value of the AT stored in the inode. In one embodiment, determining that the value of the AT stored in the row is different than the value of the AT stored in the inode includes determining if the value of the AT stored in the row is within a threshold difference of the value of the AT stored in the inode.

Embodiments described herein facilitate restoring an expired or deleted tier-copy upon reference to the file associated with the expired or deleted tier-copy. In one embodiment, the tier-copy policy further includes a restore-on-reference flag. In this embodiment, example methods and apparatus check if the file stored in the multi-tier data storage system has been accessed, and if a tier-copy of the file has been deleted. Upon detecting that both the file stored in the location in the multi-tier data storage system has been accessed, and that a tier-copy of the file has been deleted, example methods and apparatus check if the restore-on-reference flag for the tier-copy policy has been set. Checking if the restore-on-reference flag has been set may include, in one embodiment, accessing a "flags" value in a row associated with the tier-copy policy associated with the tier-copy in the "classcpy" table as illustrated in FIG. 6. Then, upon determining that the restore-on-reference flag has been set, example methods and apparatus may reinstate a deleted tier-copy of the file. Reinstating the deleted copy may include, accessing a first tier-copy associated with the file that is stored in a first tier, generating a copy of the first tier-copy, and storing the copy of the first tier-copy as a second tier-copy in a second, different tier. Restoring a tier-copy on reference thus facilitates restoring the performance aspects of those tiers to the file.

Embodiments described herein facilitate adaptively updating the EI or the schedule based on properties or conditions of the multi-tier storage system or environment in which example methods and apparatus operate. In one embodiment, upon determining that an attribute of a tier has reached a threshold level, example methods and apparatus may adjust the EI associated with the tier. The attribute may include, for example, an available storage capacity, a reliability, an access speed, or an access frequency. In another embodiment, the attribute may include other, different properties, or combinations of properties. For example, the EI associated with a tier may be adjusted based on a combination of available storage capacity and access speed.

Figure 4:
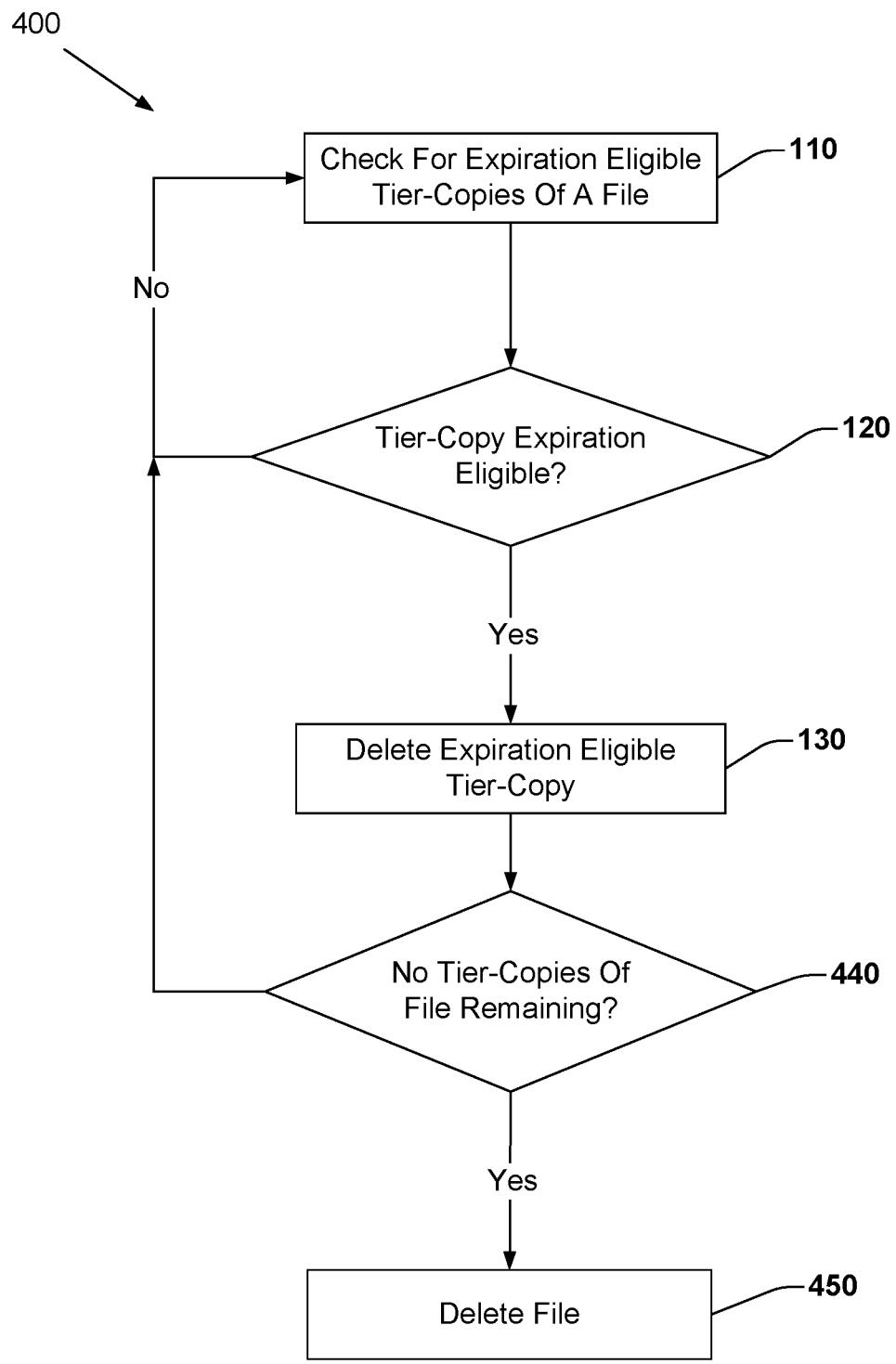
FIG. 4 illustrates an example method associated with automatically releasing storage space in a tiered storage system.

FIG. 4 illustrates an example method 400 that is similar to method 100 but that includes additional elements and details. Method 400 includes, at 130, deleting an expiration-eligible tier-copy. Method 400 further includes, at 440, determining if no more tier-copies associated with the file remain in the multi-tier storage system. Method 400 further includes, at 450, upon determining that the tier-copy deleted at 130 was the last remaining tier-copy of the file in the multi-tier data storage system, deleting the file from the multi-tier data storage system.

Embodiments described herein may include additional steps for determining if a tier-copy is expiration eligible. In one embodiment, example methods and apparatus may retain one remaining tier-copy in the multi-tier data storage system. For example, method 100 at 120, in determining if a tier-copy is expiration eligible, may further include determining that the tier-copy is not the last remaining tier-copy of the file in the multi-tier data storage system. Retaining one tier-copy in the multi-tier data storage system facilitates restoring on reference a deleted or expired tier-copy.

In another embodiment, methods and apparatus described herein may, upon determining, based, at least in part, on the EI and the AT, that a tier-copy of the file is expiration eligible, further check if a threshold number of tier-copies of the file have been stored in the multi-tier data storage system. In this embodiment, upon determining that a threshold number of tier-copies of the file have been stored in the multi-tier data storage system, example methods and apparatus may then delete the tier-copy. In one embodiment, expiration of a tier-copy associated with a first file is delayed until all tier-copies for that file have been made. This avoids inefficiencies that arise in maintenance of pending-copy information.

Methods and apparatus described herein support file versioning or tier-copy versioning. In one embodiment, a tier-copy has a version number. Different tier-copies associated with the same file may have different version numbers. Methods and apparatus described herein determine if a first tier-copy having a first version number is expiration eligible. The first tier-copy is associated with a first file. In this embodiment, upon determining that the first tier-copy having a first version number is expiration eligible, example methods and apparatus delete the first tier-copy. Example methods and apparatus may further delete a second tier-copy associated with the first file, where the second tier-copy has a second, different version number. Embodiments described herein may be configured to delete all versions of tier-copies associated with a file, or a threshold number of versions of tier-copies associated with the file.

For example, in one embodiment, a version number is associated with a file at a point in time. All tiers having a copy with the same version number defines the set of tier-copies for the file at that version. For example, a class policy defines two tier-copies (X and Y) that are both expirable. A file is created at version 1, and copies are made to both tiers. Copy Y expires and is deleted. The file is then modified, creating version 2, and copies are made to both tier X and tier Y. At this point, the set of copies includes 1X, 2X, and 2Y. Then, the user makes version 1 active. Since tier-copy/version 1Y is already expired, and the system does not look outside of the current version for expiration processing, there is no expiration processing that would affect tier-copy/version 2Y. Next, the file is modified, creating version 3, and both tier-copies are created for that version. At this point, the set of tier-copy/versions includes 1X, 2X, 2Y, 3X, and 3Y. Finally, expiration processing finds tier-copy/version 3Y to be eligible for deletion, and as tier-copy/version 3Y is deleted, 2Y is also deleted. At this point, the set of tier-copy/versions includes 1X, 2X, and 3X. At a future time, the system might decide to look outside of the current version for expiration processing, but in this example, that is not done.

Embodiments described herein may include support for manual deletion of a tier-copy, or manual deletion of a file. For example, in one embodiment, in response to receiving a signal to accelerate the expiration of a file or a tier-copy associated with the file, example methods and apparatus may declare the tier-copy as expiration eligible. Upon declaring the tier-copy as expiration eligible, example methods and apparatus may delete the tier-copy. In this embodiment, example methods and apparatus may declare the tier-copy as expiration eligible, and delete the tier-copy, without performing the checking illustrated at element 120 of FIG. 1 or FIG. 4.

Like numbers refer to like or similar elements throughout the description of the figures. When an element is referred to as being "connected" to another element, it can be directly connected to the other element or intervening elements may be present. In contrast, when an element is referred to as being "directly connected" to another element, there are no intervening elements present. Other words used to describe the relationship between elements should be interpreted in a like fashion (e.g., "between" versus "directly between," "adjacent" versus "directly adjacent," etc.)

Figure 7:
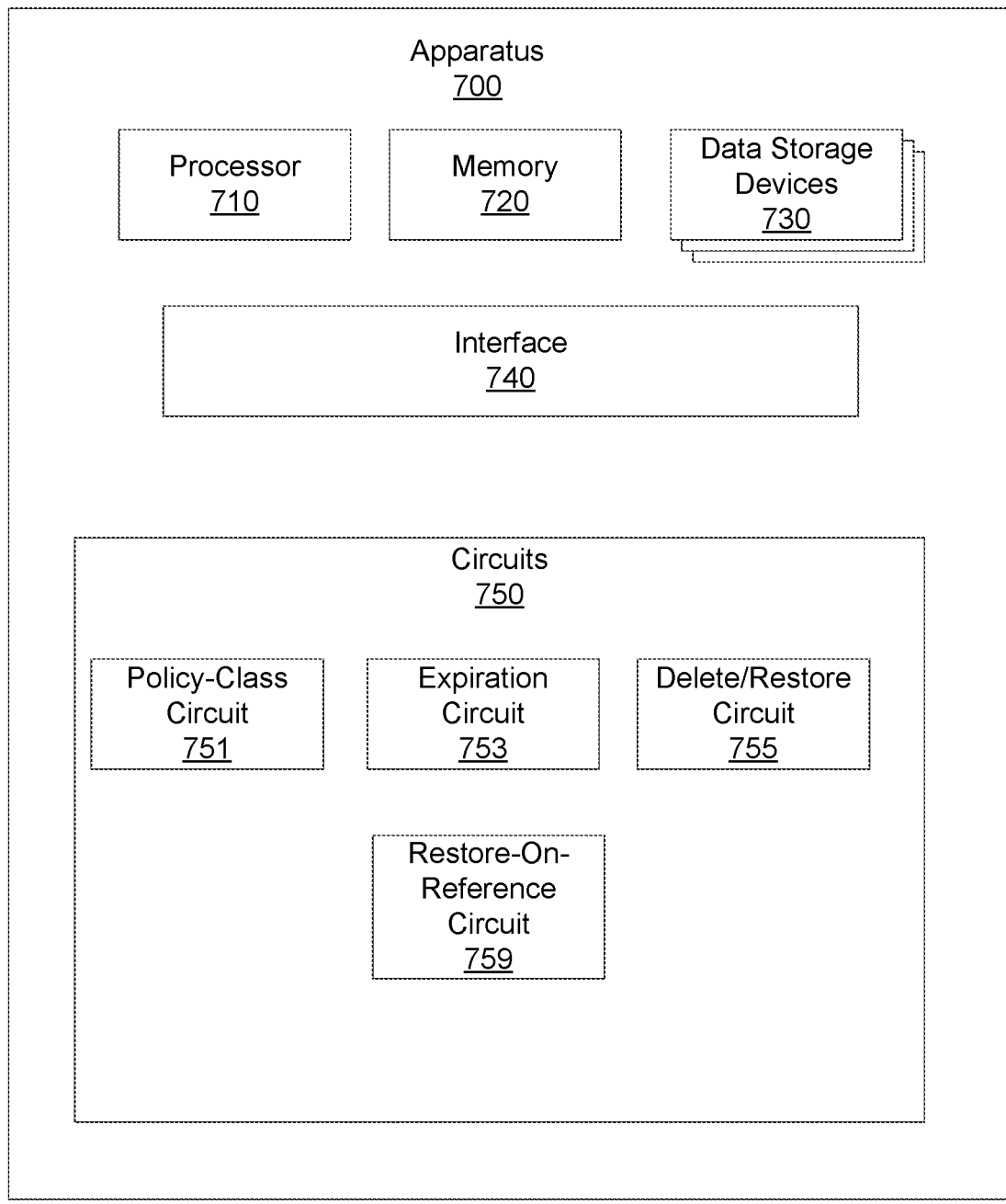
FIG. 7 illustrates an example apparatus associated with automatically releasing storage space in a tiered storage system.

FIG. 7 illustrates an example apparatus 700 for releasing storage space in a multi-tier data storage system. The multi-tier data storage system includes at least two tiers. The at least two tiers include a plurality of data storage devices 730. Members of the plurality of data storage devices 730 may include data storage devices that have different performance properties. For example, in one embodiment, the plurality of data storage devices 730 may include a tape drive, a hard disk drive (HDD), and a solid-state device (SSD). The tape drive may have a greater storage capacity than the HDD, but have slower performance than the HDD. The HDD may have greater storage capacity than the SSD, but may have slower performance than the SSD. In another embodiment, the multi-tier data storage system may include other, different numbers of data storage devices, or other, different types or combinations of types of data storage devices. In one embodiment, the performance level of a tier is a function of at least one performance property. For example, the performance level of a tier may be a function of a remaining storage capacity and an access speed of the tier.

Apparatus 700 includes a memory 720 that may store a tier-copy policy. Memory 720 may store the tier-copy policy using, for example, the database architecture illustrated in FIG. 6. Apparatus 700 also includes a processor 710, a set of circuits 750, and an interface 740 that connects the memory 720, the processor 710, data storage devices 730, and the set of circuits 750.

The set of circuits 750 includes a policy-class circuit 751 that defines a tier-copy policy associated with a tier in the multi-tier data storage system. The tier-copy policy includes an EI associated with the tier, a schedule associated with the tier, and a restore-on-reference flag associated with the tier. In one embodiment, the EI defines a positive integer number of seconds. In another embodiment, the EI may be defined using other, different units. Different tier-copy policies associated with different tiers may define different EIs or different schedules. For example, a first tier-copy policy associated with a first tier may have an EI of ten seconds, and a schedule that calls for checking for expiration eligible tier-copies every ten minutes, while a second tier-copy policy associated with a second, different tier may have an EI of one thousand seconds, and a schedule that calls for checking for expiration-eligible copies weekly.

In one embodiment, policy-class circuit 751 adjusts an EI based upon an attribute of a tier. In one embodiment, upon determining that an attribute of a tier has reached a threshold level, policy-class circuit 751 adjusts the EI associated with the tier. In one embodiment, the attribute includes an available storage capacity, a reliability, an access speed, or an access frequency. The attribute may be based on a combination of performance characteristics of the tier, or a performance level of the tier. Adjusting the EI associated with the tier may include increasing the value of the EI, or decreasing the value of the EI. The EI may also be user adjustable. In another embodiment, policy-class circuit 751 adjusts a schedule associated with a tier based on an attribute of the tier.

The set of circuits 750 also includes a copy expiration circuit 753. Copy expiration circuit 753 checks, according to the schedule associated with the tier, for expiration-eligible tier-copies of a file stored in the multi-tier data storage system based, at least in part, on an EI associated with a tier, and on an access time (AT) associated with the file. The AT denotes the last time the file was accessed. Copy expiration circuit 753, upon determining that a tier-copy is expiration eligible, declares the tier-copy as expiration eligible.

Copy expiration circuit 753 checks for expiration-eligible tier-copies by, for a tier-copy, accessing the AT value associated with the file. Copy expiration circuit 753 further accesses the EI associated with the tier, and accesses a current time. Copy expiration circuit 753 further computes a sum of the AT and the EI. Upon determining that the sum of the AT and the EI is less than or equal to the current time, copy expiration circuit 753 declares the tier-copy as expiration eligible. In one embodiment, copy expiration circuit 753 accesses the AT value associated with the file by accessing an AT value stored in a row in a database table associated with the file. Copy expiration circuit 753 may further verify that the tier-copy is expiration-eligible by accessing an AT value stored in an inode associated with the file, and by computing a second sum of the AT value stored in the inode and the EI. If the sum of the AT and the EI is equal to or within a threshold value of the second sum, copy expiration circuit 753 declares the tier-copy as expiration-eligible. Copy expiration circuit 753 may then update the value of the AT stored in the row in the database table based on the value of the AT stored in the inode.

The set of circuits 750 also includes a delete/restore circuit 755. Delete/restore circuit 755, upon copy expiration circuit 753 declaring that the tier-copy is expiration eligible, deletes the tier-copy.

In one embodiment, copy expiration circuit 753 may control the delete/restore circuit 755 to delete an expiration-eligible tier-copy only when a threshold number of tier-copies have been stored. In this embodiment, upon determining, based, at least in part, on the EI and the AT, that a tier-copy of the file is expiration eligible, copy expiration circuit 753 further checks if a threshold number of tier-copies of the file have been stored in the multi-tier data storage system. Upon determining that a threshold number of tier-copies of the file have been stored in the multi-tier data storage system, copy expiration circuit 753 controls the delete/restore circuit 755 to delete the tier-copy. The threshold number of tier-copies may be defined by a value associated with the tier-copy policy. The threshold number of tier-copies may be, for example, two, five, or some other integer greater than zero.

In one embodiment, the set of circuits 750 further includes a restore-on-reference circuit 759. Restore-on-reference circuit 759 detects if the file stored in the location in the multi-tier data storage system has been accessed. Upon detecting that the file has been accessed, restore-on-reference circuit 759 further detects if a tier-copy of the file has been deleted. Upon determining that a tier-copy of the file has been deleted, restore-on-reference circuit 759 further detects if the restore-on-reference flag associated with the file has been set. Upon determining that the restore-on-reference flag has been set, restore-on-reference circuit 759 controls the delete/restore circuit 755 to reinstate a deleted tier-copy of the file to the tier. Reinstating the deleted tier-copy may include accessing a first tier-copy associated with file stored in a first tier, and copying the first tier-copy to the tier from which the deleted tier-copy of the file has been deleted.

In one embodiment, the set of circuits 750 further includes a manual deletion circuit. The manual deletion circuit, in response to receiving a signal to accelerate the expiration of a tier-copy, controls the copy expiration circuit 753 to declare the tier-copy as expiration eligible. The manual deletion circuit further controls the delete/restore circuit 755 to delete the tier-copy.

Embodiments described herein include an apparatus employed in a multi-tier data storage system, the apparatus configured to release storage space in the multi-tier data storage system. The multi-tier data storage system includes at least two tiers. The at least two tiers include a plurality of data storage devices. Members of the plurality of data storage devices may include data storage devices that have different performance properties. For example, in one embodiment, the plurality of data storage devices may include a tape drive, a HDD, and an SSD. A member of the at least two tiers has an associated tier-copy policy. A tier-copy policy includes an EI associated with the tier. A tier-copy policy may also include a schedule. The apparatus includes one or more processors. The one or more processors are configured to, according to a schedule defined by the tier-copy policy, control the multi-tier data storage system to check for expiration-eligible tier-copies of a file stored in the tiered data storage system. The file has an associated AT that denotes the last time the file was accessed. A tier-copy is stored in a location in the tier. For example, a first tier-copy associated with the file may be stored in a first tier, and a second tier-copy associated with the file may be stored in a second, different tier.

The one or more processors are further configured to, upon determining that a tier-copy of the file is expiration eligible, delete the tier-copy. The one or more processors determine that a tier-copy is expiration eligible based, at least in part, on the EI and the AT.

The one or more processors are further configured to detect if the file stored in the multi-tier data storage system has been accessed. Upon detecting that the file stored in the multi-tier data storage system has been accessed, the one or more processors may update an AT associated with the file. The AT may be stored in an inode associated with the file.

In one embodiment, the one or more processors are further configured to access an AT stored in a row in a data base table associated with the file. The one or more processors further access an EI associated with a tier, and access a current time. The one or more processors then compute a first sum of the EI and the AT stored in the row in the data base. Upon determining that the first sum is less than or equal to the current time, the one or more processors are configured to access the AT stored in the inode associated with the file and to compute a second sum of the EI and AT stored in the inode. Upon determining that the second sum is less than or equal to the current time, the one or more processors are configured to declare the tier-copy as expiration eligible. In one embodiment, upon determining that the value of the AT stored in the row is outside a threshold value of the value of the AT stored in the inode, the one or more processors are configured to update the AT stored in the row with the value of the AT stored in the inode.

In one embodiment, the one or more processors are configured to dynamically update the EI or the schedule associated with a tier based on a performance property of a member of the plurality of data storage devices. For example, a first tier that has a threshold amount of storage space remaining may have its associated EI decreased. In another example, a second tier experiencing a threshold level of I/O activity may have the schedule associated with the second tier altered.

Figure 8:
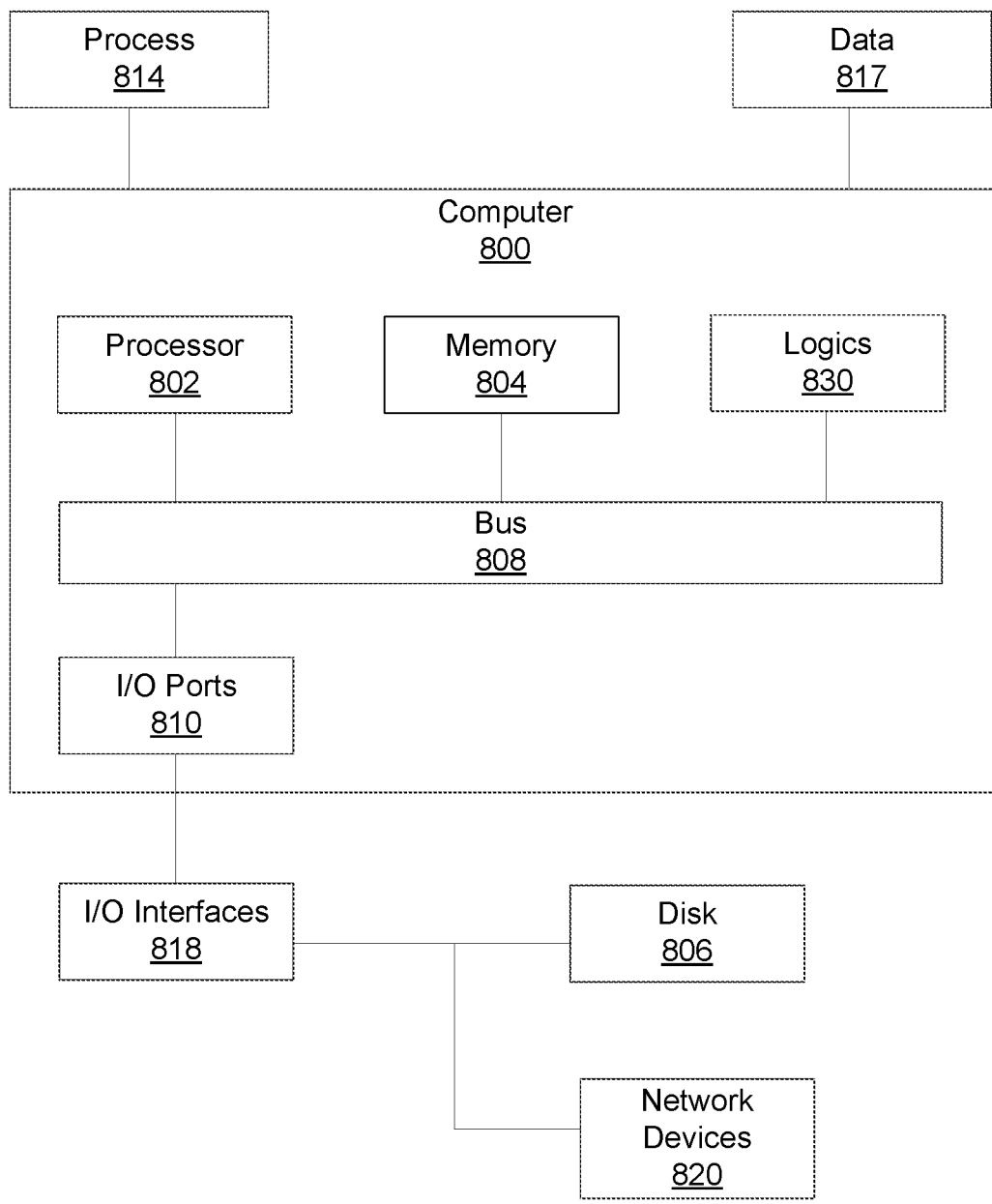
FIG. 8 illustrates an example computer in which example embodiments may operate.

FIG. 8 illustrates an example computer 800 in which example methods illustrated herein, including methods 100, 200, 300, or 400, can operate and in which example circuits and apparatus may be implemented. In different examples, computer 800 may be part of a multi-tier data storage system, may be operably connectable to a multi-tier data storage system, or may be part of a cloud data storage system.

Computer 800 includes a processor 802, a memory 804, and input/output ports 810 operably connected by a bus 808. In one example, computer 800 may include a set of logics 830 that perform a method of automatically releasing storage space in a multi-tier data storage system. Thus, the set of logics 830, whether implemented in computer 800 as hardware, firmware, and/or a combination thereof may provide means (e.g., hardware, firmware, circuits) for automatically releasing storage space in a multi-tier data storage system based on an expiration interval associated with a tier and an access time associated with a file stored or having tier-copies stored in the multi-tier data storage system. In different examples, the set of logics 830 may be permanently and/or removably attached to computer 800.

Processor 802 can be a variety of various processors including dual microprocessor and other multi-processor architectures. Memory 804 can include volatile memory and/or non-volatile memory. A disk 806 may be operably connected to computer 800 via, for example, an input/output interface (e.g., card, device) 818 and an input/output port 810. Disk 806 may include, but is not limited to, devices like a magnetic disk drive, a tape drive, a Zip drive, a flash memory card, or a memory stick. Furthermore, disk 806 may include optical drives like a CD-ROM or a digital video ROM drive (DVD ROM). Memory 804 can store processes 814 or data 817, for example. Disk 806 or memory 804 can store an operating system that controls and allocates resources of computer 800.

Bus 808 can be a single internal bus interconnect architecture or other bus or mesh architectures. While a single bus is illustrated, it is to be appreciated that computer 800 may communicate with various devices, logics, and peripherals using other buses that are not illustrated (e.g., PCIE, SATA, Infiniband, 1394, USB, Ethernet).

Computer 800 may interact with input/output devices via I/O interfaces 818 and input/output ports 810. Input/output devices can include, but are not limited to, a keyboard, a microphone, a pointing and selection device, cameras, video cards, displays, disk 806, network devices 820, or other devices. Input/output ports 810 can include but are not limited to, serial ports, parallel ports, or USB ports.

Computer 800 may operate in a network environment and thus may be connected to network devices 820 via I/O interfaces 818 or I/O ports 810. Through the network devices 820, computer 800 may interact with a network. Through the network, computer 800 may be logically connected to remote computers. The networks with which computer 800 may interact include, but are not limited to, a local area network (LAN), a wide area network (WAN), or other networks. For example, computer 800 may be operably connected to and interact with a cloud storage system that operates as a tier for a multi-tier data storage system.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not-illustrated blocks.

In one example, a method may be implemented as computer-executable instructions. Thus, in one example, a computer-readable storage device may store computer-executable instructions that if executed by a machine (e.g., processor) cause the machine to perform method 100, method 200, method 300, or method 400. While executable instructions associated with method 100, method 200, method 300, or method 400 are described as being stored on a computer-readable storage device, it is to be appreciated that executable instructions associated with other example methods described herein may also be stored on a computer-readable storage device.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable storage medium" or "computer-readable storage device" as used herein, refers to a non-transitory medium that stores instructions and/or data. "Computer-readable storage medium" or "computer-readable storage device" does not refer to propagated signals, per se. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium or computer-readable storage device may include, but are not limited to, a floppy disk, a flexible disk, a hard disk, a magnetic tape, a solid-state device (SSD) a shingled magnetic recording (SMR) device, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Circuit", as used herein, includes but is not limited to hardware, or firmware, and/or combinations of each to perform a function(s) or an action(s), and/or to cause a function or action from another logic, method, and/or system. A circuit may include, for example, a discrete logic (e.g., ASIC), an analog circuit, a digital circuit, a programmed logic device, or a memory device containing instructions. A circuit may include one or more gates, combinations of gates, or other circuit components. Where multiple circuits are described, it may be possible to incorporate the multiple circuits into one circuit. Similarly, where a single circuit is described, it may be possible to distribute that single circuit between multiple circuits.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

While example methods, apparatus, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable storage device storing computer-executable instructions that when executed by a computer cause the computer to perform a method for releasing storage space in a multi-tier data storage system, where the multi-tier data storage system includes at least two tiers, where a tier has an associated tier-copy policy, and where the tier-copy policy includes an expiration interval (EI) associated with the tier, the method comprising:
according to a schedule defined by the tier-copy policy, controlling the multi-tier data storage system to check for expiration-eligible tier-copies of a file stored in the multi-tier data storage system, where the file has an associated access time (AT) that denotes the last time the file was accessed, and where a tier-copy of the file is stored in a location in a tier of the multi-tier data storage system;
upon detecting that the file stored in the multi-tier data storage system has been accessed:
updating the AT associated with the file, where updating the AT associated with the file includes updating an AT stored in an inode associated with the file, and updating, asynchronously from updating the AT stored in the inode, an AT stored in a row in a data base table associated with the file;
where controlling the multi-tier data storage system to check for the expiration-eligible tier copies of the file comprises:
accessing the AT stored in the row in the data base table associated with the file and accessing the EI associated with the tier;
accessing a current time;
computing a first sum of the EI and the AT stored in the row in the data base;
upon determining that the first sum is less than or equal to the current time:
accessing the AT stored in the inode associated with the file;
computing a second sum of the EI and AT stored in the inode;
upon determining that the second sum is less than or equal to the current time:
declaring the tier-copy as expiration eligible; and
upon determining, based, at least in part, on the EI, the AT stored in the inode, and the AT stored in the row in the data base, that the tier-copy of the file is expiration eligible:
deleting the tier-copy.

2. The non-transitory computer-readable storage device of claim 1, where the at least two tiers include different types of data storage apparatus selected from a random-access memory (RAM) apparatus, a flash memory apparatus, a solid-state device (SSD) apparatus, a disk apparatus, a tape apparatus, and a cloud-based storage apparatus.

3. The non-transitory computer-readable storage device of claim 2, where a first member of the at least two tiers has a capacity, a performance level, a reliability, or a cost of use, and where a second member of the at least two tiers has a different capacity, a different performance level, a different reliability, or a different cost of use.

4. The non-transitory computer-readable storage device of claim 1, where the EI is an integer value in seconds, minutes, hours, or days.

5. The non-transitory computer-readable storage device of claim 1, where upon determining that the second sum is less than or equal to the current time, further comprising:
upon determining that the value of the AT stored in the row is different than the value of the AT stored in the inode:
updating the AT stored in the row with the value of the AT stored in the inode.

6. The non-transitory computer-readable storage device of claim 1, where the tier-copy policy further includes a restore-on-reference flag.

7. The non-transitory computer-readable storage device of claim 6, the method further comprising:
upon detecting that the file stored in the location in the multi-tier data storage system has been accessed, and upon determining that a tier-copy of the file has been deleted:
upon determining that the restore-on-reference flag has been set:
reinstating a deleted tier-copy of the file.

8. The non-transitory computer-readable storage device of claim 1, the method further comprising:

upon determining that an attribute of a tier has reached a threshold level:
adjusting the EI associated with the tier.

9. The non-transitory computer-readable storage device of claim 8, where the attribute includes an available storage capacity, a reliability, an access speed, or an access frequency, or a combination of an available storage capacity, a reliability, an access speed, or an access frequency.

10. The non-transitory computer-readable storage device of claim 1, where determining that a tier-copy of the file is expiration eligible further comprises determining that the tier-copy is not the last remaining tier-copy of the file in the multi-tier data storage system.

11. The non-transitory computer-readable storage device of claim 1, where a tier-copy has a version number.

12. The non-transitory computer-readable storage device of claim 11, the method further comprising:
upon determining that a first tier-copy having a first version number is expiration eligible, where the first tier-copy is associated with a first file:
deleting the first tier-copy; and
deleting a second tier-copy associated with the first file, where the second tier-copy has a second, different version number.

13. The non-transitory computer-readable storage device of claim 1, the method further comprising:
upon determining that no tier-copies of the file remain in the multi-tier data storage system:
deleting the file from the multi-tier data storage system.

14. The non-transitory computer-readable storage device of claim 1, the method further comprising:
upon determining, based, at least in part, on the EI, the AT stored in the inode, and the AT stored in the row in the data base, that a tier-copy of the file is expiration eligible:
upon determining that a threshold number of tier-copies of the file have been stored in the multi-tier data storage system:
deleting the tier-copy.

15. The non-transitory computer-readable storage device of claim 1, the method further comprising:
in response to receiving a signal to accelerate the expiration of a file or a tier-copy associated with the file:
declaring the tier-copy as expiration eligible; and
deleting the tier-copy.

16. An apparatus for releasing storage space in a multi-tier data storage system, where the multi-tier data storage system includes at least two tiers, the apparatus comprising:
a memory that stores a tier-copy policy;
a processor;
a set of circuits; and
an interface that connects the memory, the processor, and the set of circuits, the set of circuits comprising:
a policy-class circuit that defines a tier-copy policy associated with a tier, where the tier-copy policy includes an expiration interval (EI) associated with the tier, a schedule associated with the tier, and a restore-on-reference flag associated with the tier, where the EI defines a positive integer number of seconds;
a copy expiration circuit that accesses an access time (AT) associated with a file stored in the multi-tier data storage system, where the AT denotes the last time the file was accessed, where accessing the AT associated with the file includes accessing an AT stored in a row in a data base table associated with the file, and accessing an AT stored in an inode associated with the file, where the copy expiration circuit checks, according to the schedule associated with the tier, for expiration-eligible tier-copies of the file stored in the multi-tier data storage system based, at least in part, on an EI associated with a tier, the AT stored in the inode, and the AT stored in the row in the data base table, where the copy expiration circuit, upon determining that a tier-copy of the file is expiration eligible: declares the tier-copy as expiration eligible, where the copy expiration circuit checks for expiration-eligible tier-copies by:
accessing the AT stored in the row in the data base table;
accessing the EI associated with the tier;
accessing a current time;
computing a first sum of the EI and the AT stored in the row in the data base table;
upon determining that the first sum is less than or equal to the current time:
accessing the AT stored in the inode associated with the file;
computing a second sum of the EI and AT stored in the inode;
upon determining that the second sum is less than or equal to the current time:
declaring the tier-copy as expiration eligible; and
a delete/restore circuit that, upon the copy expiration circuit declaring that the tier-copy is expiration eligible, deletes the tier-copy.

17. The apparatus of claim 16, further comprising a restore-on-reference (RoR) circuit that:
upon detecting that the file stored in the location in the multi-tier data storage system has been accessed, and upon determining that a tier-copy of the file has been deleted:
upon determining that the restore-on-reference flag has been set:
controls the delete/restore circuit to reinstate a deleted tier-copy of the file to the tier.

18. The apparatus of claim 16, where the policy-class circuit:
upon determining that an attribute of a tier has reached a threshold level:
adjusts the EI associated with the tier, where the attribute includes an available storage capacity, a reliability, an access speed, or an access frequency.

19. The apparatus of claim 16, where the copy expiration circuit:
upon determining, based, at least in part, on the EI, the AT stored in the inode, and the AT stored in the row in the data base, that a tier-copy of the file is expiration eligible:
upon determining that a threshold number of tier-copies of the file have been stored in the multi-tier data storage system:
controls the delete/restore circuit to delete the tier-copy.

20. The apparatus of claim 16, the set of circuits further comprising a manual deletion circuit that:
in response to receiving a signal to accelerate the expiration of a tier-copy:
controls the expiration circuit to declare the tier-copy as expiration eligible; and
controls the delete/restore circuit to delete the tier-copy.

21. An apparatus employed in a multi-tier data storage system, where the multi-tier data storage system includes at least two tiers, where a tier has an associated tier-copy policy, and where the tier-copy policy includes an expiration interval (EI) associated with the tier, the apparatus comprising:

one or more processors configured to:
- according to a schedule defined by the tier-copy policy, control the multi-tier data storage system to check for expiration-eligible tier-copies of a file stored in the tiered data storage system, where the file has an associated access time (AT) that denotes the last time the file was accessed, and where a tier-copy of the file is stored in a location in the tier of the multi-tier data storage system;
- upon detecting that the file stored in the multi-tier data storage system has been accessed:
  - update the AT associated with the file, where updating the AT associated with the file includes updating an AT stored in an inode associated with the file, and updating, asynchronously from updating the AT stored in the inode, an AT stored in a row in a data base table associated with the file;
- access the AT stored in the row in the data base table associated with the file and access the EI associated with the tier;
- access a current time;
- compute a first sum of the EI and the AT stored in the row in the data base;
- upon determining that the first sum is less than or equal to the current time:
  - access the AT stored in the inode associated with the file;
  - compute a second sum of the EI and AT stored in the inode;
  - upon determining that the second sum is less than or equal to the current time:
    - declare the tier-copy as expiration eligible; and
  - upon determining, based, at least in part, on the EI, the AT stored in the inode, and the AT stored in the row in the data base, that the tier-copy of the file is expiration eligible:
    - delete the tier-copy.

22. The apparatus of claim 21, where upon determining that the second sum is less than or equal to the current time the one or more processors further configured to:
- upon determining that the value of the AT stored in the row is outside a threshold value of the value of the AT stored in the inode:
  - update the AT stored in the row with the value of the AT stored in the inode.

* * * * *